United States Patent [19]
Keesen

[11] Patent Number: 6,101,314
[45] Date of Patent: *Aug. 8, 2000

[54] DIGITAL VIDEO SIGNAL PROCESSING FOR RECORDING AND REPLAY

[75] Inventor: Heinz-Werner Keesen, Hannover, Germany

[73] Assignee: Deutsche Thomson-Brandt GmbH, Villingen-Schwenningen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/780,923

[22] Filed: Jan. 9, 1997

Related U.S. Application Data

[62] Division of application No. 08/632,033, Apr. 12, 1996, Pat. No. 5,758,012, which is a continuation of application No. 08/109,029, Aug. 18, 1993, abandoned, which is a division of application No. 07/835,737, Feb. 13, 1992, Pat. No. 5,239,308.

[51] Int. Cl.[7] .......................... H04N 5/926; H04N 5/917
[52] U.S. Cl. ............................. 386/124; 386/109
[58] Field of Search ..................... 386/109, 111, 386/112, 46, 124, 1, 27, 33, 34, 40; 360/32; 348/384, 397, 400, 403; H04N 5/926, 5/917

[56] References Cited

U.S. PATENT DOCUMENTS

| | | | |
|---|---|---|---|
| 3,553,362 | 1/1971 | Mounts et al. | 173/7.1 |
| 4,075,622 | 2/1978 | Lawrence et al. | 341/67 |

(List continued on next page.)

FOREIGN PATENT DOCUMENTS

| | | | |
|---|---|---|---|
| 0276753 | 8/1988 | European Pat. Off. | H04N 7/133 |
| 0 289960 | 11/1988 | European Pat. Off. | H04N 5/92 |
| 0255152 | 11/1988 | European Pat. Off. | |
| 0290085 | 11/1988 | European Pat. Off. | |
| 2835434 | 2/1980 | Germany | H04N 7/12 |
| 3146964 | 6/1982 | Germany | |
| 3638127 | 5/1988 | Germany | |
| 3733232 | 5/1988 | Germany | |
| 3702490 | 8/1988 | Germany | |
| 3721478 | 1/1989 | Germany | |
| 3-24887 | of 0000 | Japan | |
| 3-66272 | 3/1991 | Japan | |
| 8601005 | 11/1987 | Netherlands | |
| 2-061-059A | 5/1981 | United Kingdom | H04N 9/491 |
| WO86/02516 | 4/1986 | WIPO | |

OTHER PUBLICATIONS

On Adaptive DCT Coding Techniques for Digital Video Recording Authors de With & Borgers. IERE Proc. 7 th.Int. Conf.Video Recording, York UK. Mar. 1988 pp. 199–204.

An Experimental Digital VCR with 40mm Drum, Single Actuator and DCT Based Bit Rate Reduction, Authors Borgers, Heijnemans, de Niet, de With. IEEE vol. 34 No. 3 Aug.1988 pp. 597–603.

An Experimental Study for a Home Use Digital VTR Authors Yamamitsu et al.IEEE vol. 35 No.3 Aug.1989 pp. 450–457.

*Primary Examiner*—Robert Chevalier
*Attorney, Agent, or Firm*—Joseph S. Tripoli; Joseph J. Laks

[57] ABSTRACT

A digital video recording apparatus comprises a means for receiving a coded video image representative signal comprising components representing spatial frequencies including DC and AC frequency information. A grouping means groups components of substantially the same type to produce grouped signals for recording. A recording means records the grouped signals on a recording medium.

33 Claims, 5 Drawing Sheets

U.S. PATENT DOCUMENTS

| | | | |
|---|---|---|---|
| 4,139,867 | 2/1979 | Foerster | 360/10 |
| 4,355,324 | 10/1982 | Reitmeier | 358/312 |
| 4,375,650 | 3/1983 | Tiemann | 358/133 |
| 4,395,738 | 7/1983 | Hedlund et al. . | |
| 4,672,441 | 6/1987 | Hoelzlwimmer | 358/135 |
| 4,807,053 | 2/1989 | Heijnemans | 358/335 |
| 4,858,035 | 8/1989 | Hikawa . | |
| 4,901,075 | 2/1990 | Vogel . | |
| 4,907,101 | 3/1990 | Keesen et al. | 360/48 |
| 4,931,879 | 6/1990 | Koga et al. | 358/335 |
| 4,953,020 | 8/1990 | De With | 358/133 |
| 4,969,055 | 11/1990 | Oberjatzas et al. . | |
| 4,985,700 | 1/1991 | Mikami | 341/67 |
| 5,021,879 | 6/1991 | Vogel . | |
| 5,051,840 | 9/1991 | Watanabe et al. | 358/433 |
| 5,068,744 | 11/1991 | Ito | 358/310 |
| 5,136,391 | 8/1992 | Minami | 386/33 |
| 5,148,272 | 9/1992 | Acampora et al. | 358/133 |
| 5,237,424 | 8/1993 | Nishino et al. | 386/33 |
| 5,239,308 | 8/1993 | Keesen et al. | 341/67 |
| 5,253,122 | 10/1993 | Chiba et al. | 360/33.1 |
| 5,351,131 | 9/1994 | Nishino et al. | 360/40 |

DIGITAL VIDEO SIGNAL PROCESSING FOR RECORDING AND REPLAY

This application is a division of copending U.S. application Ser. No. 08/632,033 now U.S. Pat. No. 5,758,012, which is a continuation of U.S. application Ser. No. 08/109,029 now abadoned. U.S. application Ser. No. 109,029 is a division of U.S. application Ser. No. 835,737, now U.S. Pat. No. 5,239,308.

FIELD OF THE INVENTION

This invention is directed to a digital signal processing system for batch-bulk coded signals.

BACKGROUND OF THE INVENTION

The packing density of digital signals, or information, is often subjected to temporal fluctuations during transmission and/or record and replay. This also is applicable to, for example, video signals which were processed with a source coder for irrelevancy and redundancy reduction. Designing the transmission route, or the recording medium, for the maximum packing density is technically expensive and uneconomic. The packing density can be held to an average value through temporal compression and subsequent expansion. However, variable word lengths of the data segments can result, depending upon the packing density. This creates a problem in recognizing data segments of differing lengths and in allocating the correct position of the blocks in the output picture. Data segment recognition is particularly difficult if interference removes the recognition criteria. If such interference occurs, it is possible that an accurate recognition can not be made, even after the interference has died out. A similar problem occurs in a digital video recorder when operating in a search mode where data can only be read piece by piece in short segments. It is desirable to reconstruct a low quality picture from data distorted by interference resulting from relatively short segments read during a search operating mode.

The invention is directed to an improved processing method of digital signals, for example a television picture, such that it may be decoded with sufficient quality during periods of interference such as that resulting from a medium transduced at a speed other than the recorded speed.

U.S. Pat. No. 4,907,101 teaches the batch-bulk recording of digital signals which have been received segment-wise. Data blocks having data segments with a smaller than average word length are filled with parts of the data segments from blocks having a larger than average word length. The data can, for example, consist of the coefficients of a discrete cosine transformation DCT. The direct or DC component and one, or several, important alternating or AC components and a terminating end-of-block characteristic or flag are first recorded for each n×m picture element block, typically n=8 and m=8. When the data segment length of the coded block is smaller than an average data segment length, the remaining available space is filled up with alternating components of a block which requires a larger than average data segment length and, if it fits, with the respective end-of-block characteristic. Since the blocks are of equal length, the start of each block will be at equal time intervals which aids the location during playback in the presence of errors.

In a conventional helical-scan recording system operating in the search mode, the reading heads or transducers, move over the recorded tracks at an angle different from that in the normal reproduction mode of operation with the consequence that tracks are only partially or batch-bulk read. Thus the reproduced signal is interrupted with bursts of noise or interference as the transducer crosses from track to track. Even when the reading head is mounted on actuators to provide accurate track following adjustment, there are search speeds where the recorded tracks will be only partially or batch-bulk read.

The problem arising from reading different tracks results from the fact that the tracks are written sequentially, thus there may be time or temporal differences between the information contained in each track. Hence in search, when the transducer crosses and reads multiple tracks, the recovered signal may comprise information representing different events in time, thus the recovered signal may exhibit temporal segmentation. For example, a recording of a stationary television image may not reveal temporal segmentation until there is motion within the scene whereupon the moving image parts will appear segmented. Hence the problem is the spatial positioning of the recovered segment of data blocks in the complete decoded signal, or picture. The solution is to insert location information at particular points in the signal to be recorded which is utilized during replay, to locate the signal components in accordance with the location information. The end-of-block characteristic appears to be most suitable for this purpose. However, if location information is added to every end-of-block characteristic the amount of data to be recorded is markedly increased.

Another possibility is the combination of several blocks, for example eight, into a larger block, hereinafter called a superblock. The superblock represents a portion of the picture and is provided with an address to locate it within the picture. This address may be positioned at the start or end of the superblock. The data rate is only negligibly increased by the recording of a single address for each superblock and the total coder efficiency is increased. The output signal is reassembled from the almost equally spaced (in time) decoded superblocks. The signal is segmented according to the size of the superblock and can have an unchanged spatial resolution.

SUMMARY OF THE INVENTION

In accordance with the principles of this invention a digital video recording apparatus comprises a means for receiving a coded video image representative signal comprising components representing spatial frequencies including DC and AC frequency information. A grouping means groups components of substantially the same type to produce grouped signals for recording. A recording means records the grouped signals on a recording medium. In accordance with a feature of this invention, the coded components are grouped by significance within a range from most significant to least significance, where components of highest significance represent a DC component of a transform coded video image, which may be provided by a discrete cosine transform. In accordance with a further feature of this invention, a recorded signal comprises a plurality of signal groups, each comprising a plurality of block coded DCT video image representative signals, one of the signal groups defines an image portion and is recorded at a predetermined location on a medium. The predetermined location on the medium permits reproduction of the signal group at more than one reproduction speed.

DETAILED DESCRIPTION

Figure 1:
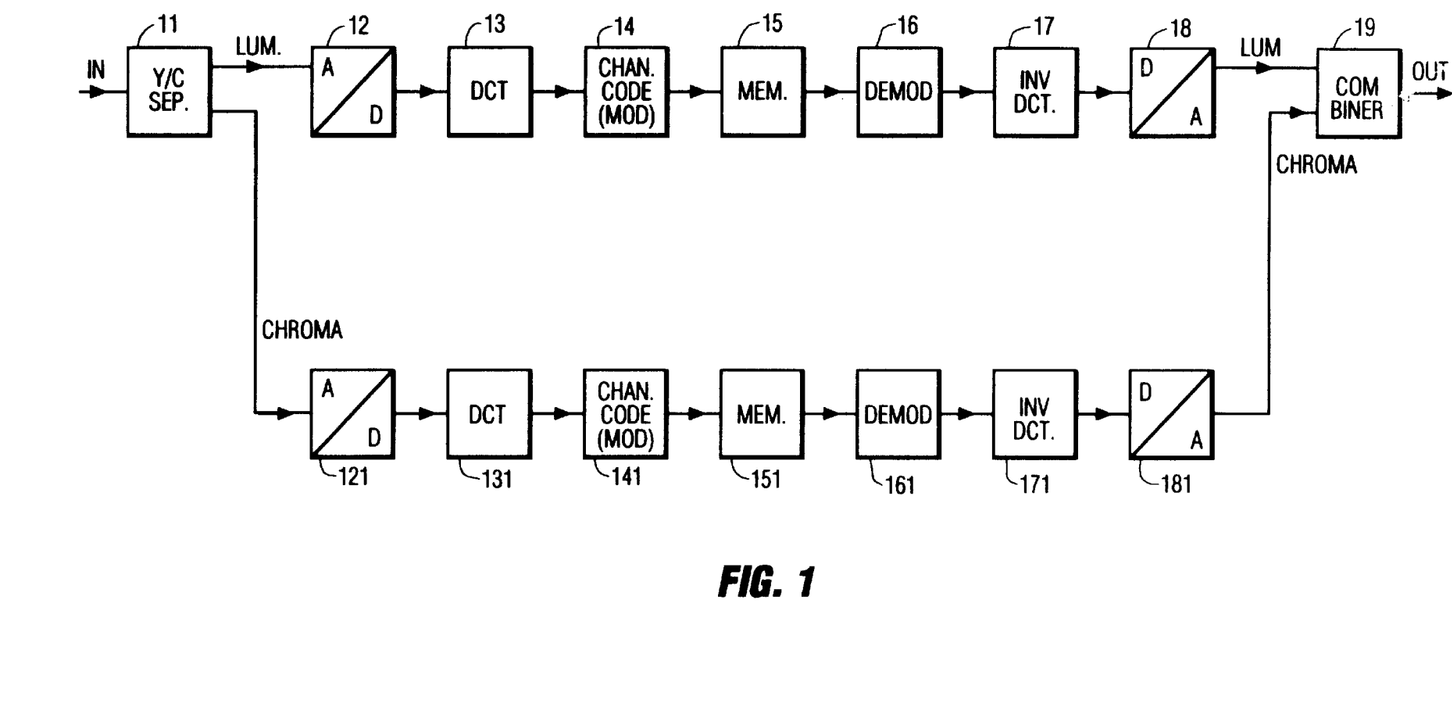
FIG. 1 is a block diagram of a video signal processing system.

FIG. 1 shows a video signal processing system, for example, the video signal section of a digital video recorder. In FIG. 1 circuit 11 separates the incoming analog composite color signal into a luminance component and a chrominance component. The luminance signal is input to an analog-to-digital converter 12, and is two-dimensionally DCT transformed in a circuit 13, modulated with a channel coding in a circuit 14, stored in a memory 15, for example a magnetic tape. The signal is read from the memory and demodulated in a circuit 16 according to the channel coding, two-dimensionally inversely DCT transformed in a circuit 17. The digital signal is coupled to a digital-to-analog converter 18, which produces a luminance signal which is re-assembled with the corresponding chrominance signal from the digital-to-analog converter 181 to produce, in circuit 19, an analog composite color signal. The chrominance signal is processed in the circuits 121 through 181 in the same way as the luminance signal in the respective circuits 12 through 18. For a digital audio signal processor the circuits 12 through 18 can be used as the sound channel and the circuits 11, 19 and 121 through 181 can be omitted.

Figure 2:
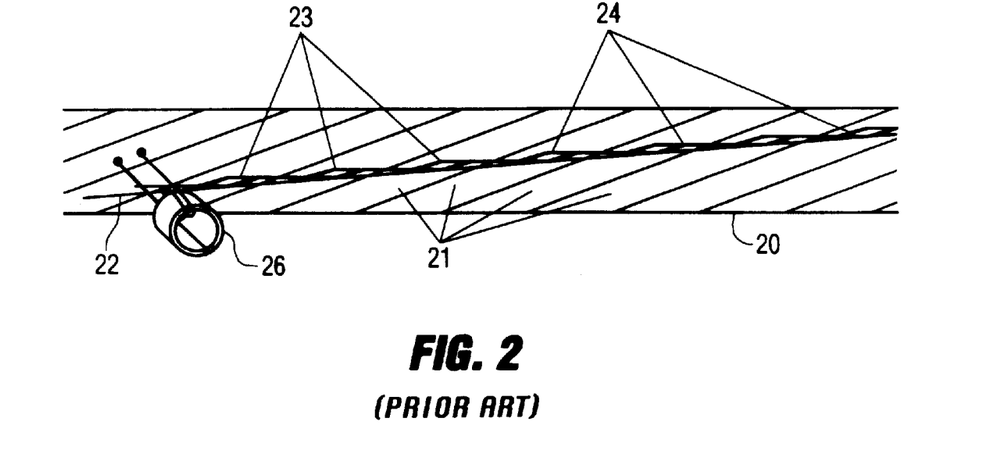
FIG. 2 shows the tracks of a digitally coded video signal on a magnetic tape with helical-scan recording and with a scanning path of the video heads in a search operating mode.

FIG. 2 shows a magnetic tape 20 with recorded helical tracks 21. The general direction of motion of the video head on the magnetic tape 20 in the search mode is indicated by the dotted line 22. The video heads, or transducers, are arranged on controllable actuators which permit the head to follow a track 21 along steps 23, reproducing segments of digital data. Between the segments of data reproduced from steps 23, the video heads advance, jumping to other positions 23 of the next data track 21, or to a more distant track 24.

Figure 3:
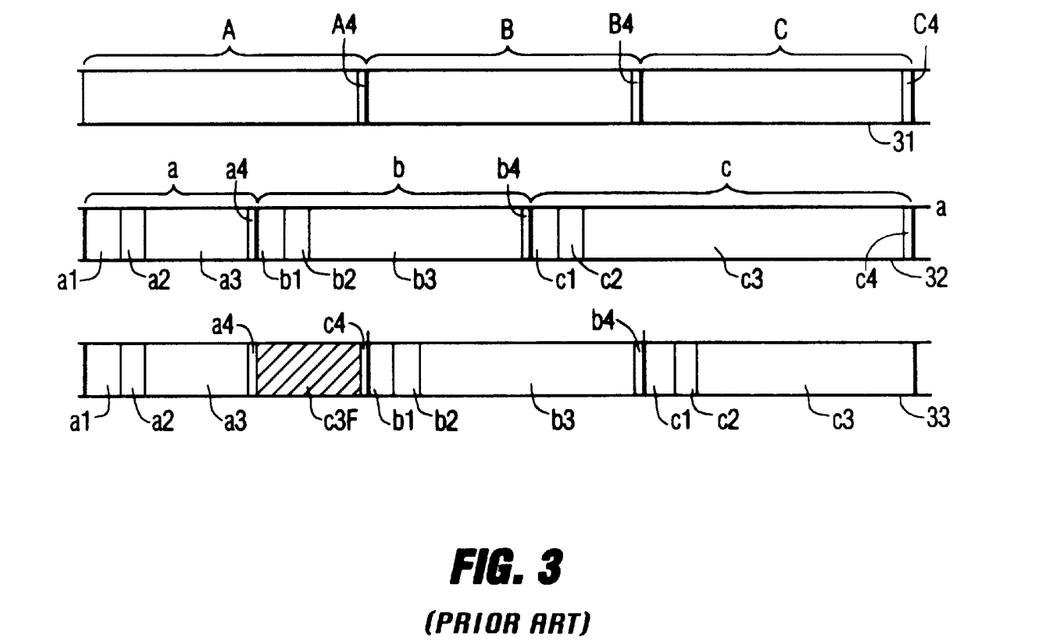
FIG. 3 shows a known recording method of block-wise coded video signals.

FIG. 3 shows an arrangement of components of video signals coded in block form on the tracks of a magnetic tape. A magnetic tape track section 31 includes three blocks of data A, B, C, of equal length having respective end-of-block characteristics A4, B4, and C4. Another track section 32 has three blocks of data a, b, c, of differing lengths. The respective lengths correspond to the amount of data which a coder, for example a DCT coder delivers. The blocks a, b, c. a1, b1 and c1 are direct or DC components. Blocks a2, b2 and c2 are important alternating or AC components, a3, b3 and c3 are less important alternating components and a4, b4 and c4 are end-of-block markings. In the presence of playback errors, noise etc., data recorded with varying block lengths, as shown in track section 32, hinders the location of the beginning of the block.

Figure 4:
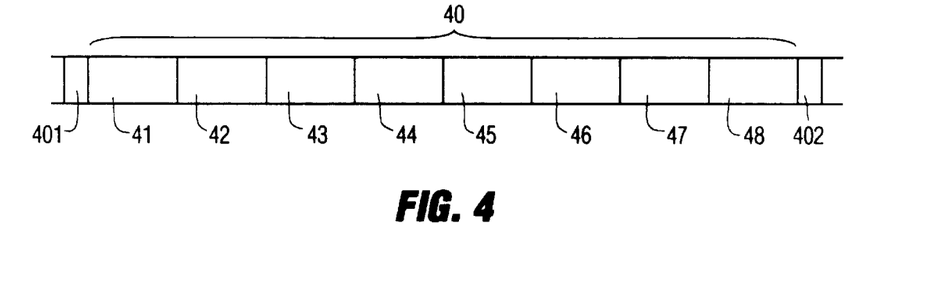
FIG. 4 shows a superblock recorded on one track of a magnetic tape according to the invention.

A consistent block length, as shown for track section 31, is advantageous. Accordingly, a constant block length is produced as shown by track 33, where a portion of the less important alternating components c3, from a block c, which has more than an average of amount of data b, is attached to a block a having less than an average amount of data b. When possible the corresponding end-of-block characteristic signal c4 is also attached to block a. This method of achieving constant block length is described in U.S. Pat. No. 4,907,101. However, it is ineffective when operating in a search mode, since the reproducing head reads partial segments 23, of helical scan tracks 21 of the magnetic tape 20. Information identifying where the read and decoded data of the track sections 23 are to be located in the output picture of a video recorder is not obtained, because only the first block of a complete picture is marked as such. The location information could be obtained by the addition of the end-of-block characteristics a4, b4, c4. However, for example, with a picture size of 540×576 picture elements and with a block size of 8×8 picture elements and a coding data rate of about 1 bit/picture element then approximately 77 bits would be necessary instead of approximately 64 bits for every block. Such an increase in the amount of data can be avoided if track sections 23 can comprise a number of blocks, for example eight, which are combined into one superblock 40, with an address word 401 or 402, added to each superblock as shown in FIG. 4. A coder must be controlled such that the data for the last block within the superblock can still be stored in the storage space for this track block. Unoccupied storage space can be filled up with the value "zero".

FIG. 4 shows a partial track of the magnetic tape with a superblock 40 consisting of constant word length blocks 41 through 48, which correspond to the blocks A, B, C of tracks 31 or 33 of FIG. 3. FIG. 4 also shows an address word 401 or 402 which provides a spatial location of the superblock within the original signal.

Figure 5:
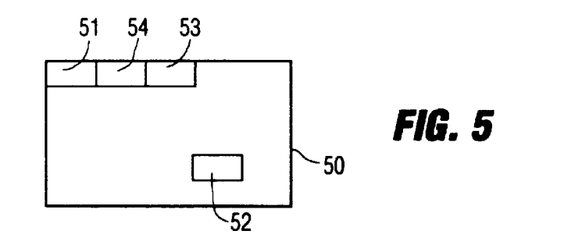
FIG. 5 shows the location of superblocks within a display picture.

FIG. 5 shows the output picture 50, of a video recorder in search mode with the position of superblocks 51 through 54. Good spatial resolution is achieved, however the picture is noticeably segmented, ie the superblocks are incorrectly located within the picture, resulting in reduced temporal resolution or temporal segmentation.

Figure 6:
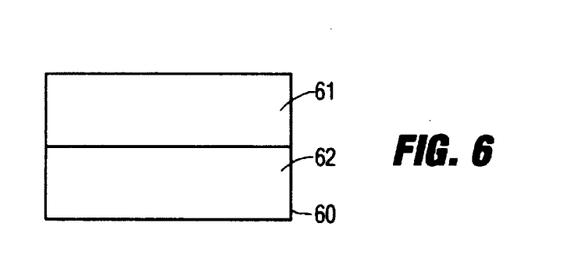
FIG. 6 shows the locations within the picture of several, or all, of the blocks of one track according to a further inventive recording method.

FIG. 6 shows a further embellishment to the method depicted in FIG. 5, which produces less segmentation. For example, only two segments 61 and 62 are present in the entire picture 60, furthermore the complete picture 60 can also be formed from one segment 60.

Figure 7:
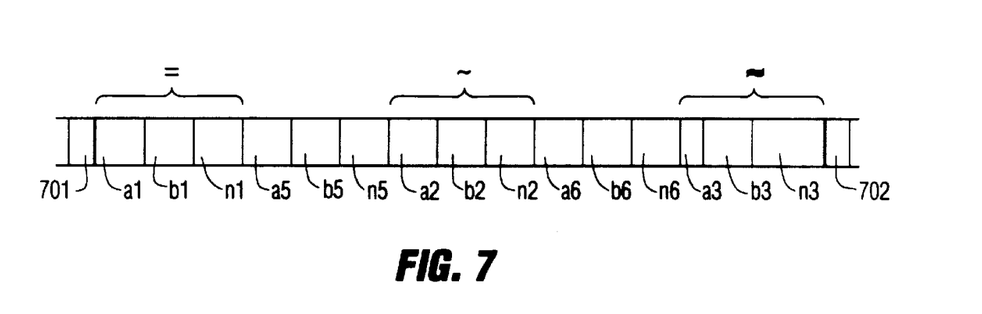
FIG. 7 shows an inventive arrangement of the signal components of the FIG. 6 method on one track of a magnetic tape.

FIG. 7 shows an inventive form of storage corresponding to that shown in FIG. 6, where the recorded sequence of direct and alternating components, generated by DCT transformation are reordered. For example, the recording sequence may be modified such that the DC components of all the blocks of one track are grouped together and recorded. Such like components may, for example, be recorded at the start of a track. The track addresses of the important AC components of the associated blocks are recorded next followed by the corresponding AC coefficients. The track addresses of the less important AC components and the less important AC components are recorded last. Less important alternating components are, for example, transformation coefficients with small amplitudes. Such track section of the signal can represent one segment or two segments, i.e. picture signal can consist of one or two segments.

A modified recorded sequence of DCT coefficients offers several options for reading and decoding at search speeds.

(1) Direct components, important alternating components, along with their track addresses, and some of the less important alternating components and their track addresses are decoded.

(2) Direct components, important alternating components and their addresses are decoded.

(3) Direct components only, are read and decoded.

At low search speeds option 1 produces a relatively high quality signal with a full temporal but reduced spatial resolution. At higher search speed option 2 is utilized resulting in a lower quality signal of somewhat reduced spatial resolution but maintaining full temporal response. The highest search speed may utilize option 3 which results in significantly reduced spatial resolution however full temporal resolution is maintained. Thus, a system utilizing grouping of like components provides a tiered or progressive reduction in spatial resolution with increasing search speed while maintaining full temporal resolution. Such a system meets the expectation of the user when viewing at non-standard reproduction speeds.

It is also possible to combine two or several of the above named recording options. For example, in a superblock configuration the constituent blocks thereof may comprise the like DCT components of that superblock picture portion.

In FIG. 7 the direct components a1, b1 and n1 are assembled and written at the start of the storage space for the segment 61, 62 or 60. The addresses a5, b5 through n5 of the important alternating components a2, b2 through n2 and the alternating components (coefficients) are written next. The addresses a6, b6 through n6 for the less important alternating components a3, b3 through n3 and the alternating components (coefficients) are written last. A characteristic 701 or 702 is inserted at the start or end of the complete track section which defines the location within the picture 60 of the segment being written (61, 62 or 60). To simplify FIG. 7 some components are not illustrated between the b and the n components, for example between b1 and n1. The coder must be controlled such that the data n1 through n6 for the last block in the segment (for example, 61, 62 or 60) is stored in the storage space provided for the segment. Unoccupied storage space can be filled with "zero" values. In high speed search, segment-free pictures are reproduced when the direct components of all blocks of one picture, or several pictures, are stored in one track of the magnetic tape and the video heads scan an appropriate area of the track. Hence if the DC components of all blocks of a picture, or several pictures, are recorded on a single magnetic track it is possible to obtain in the search mode, a segment-free picture, with reduced spatial resolution.

Figure 8:
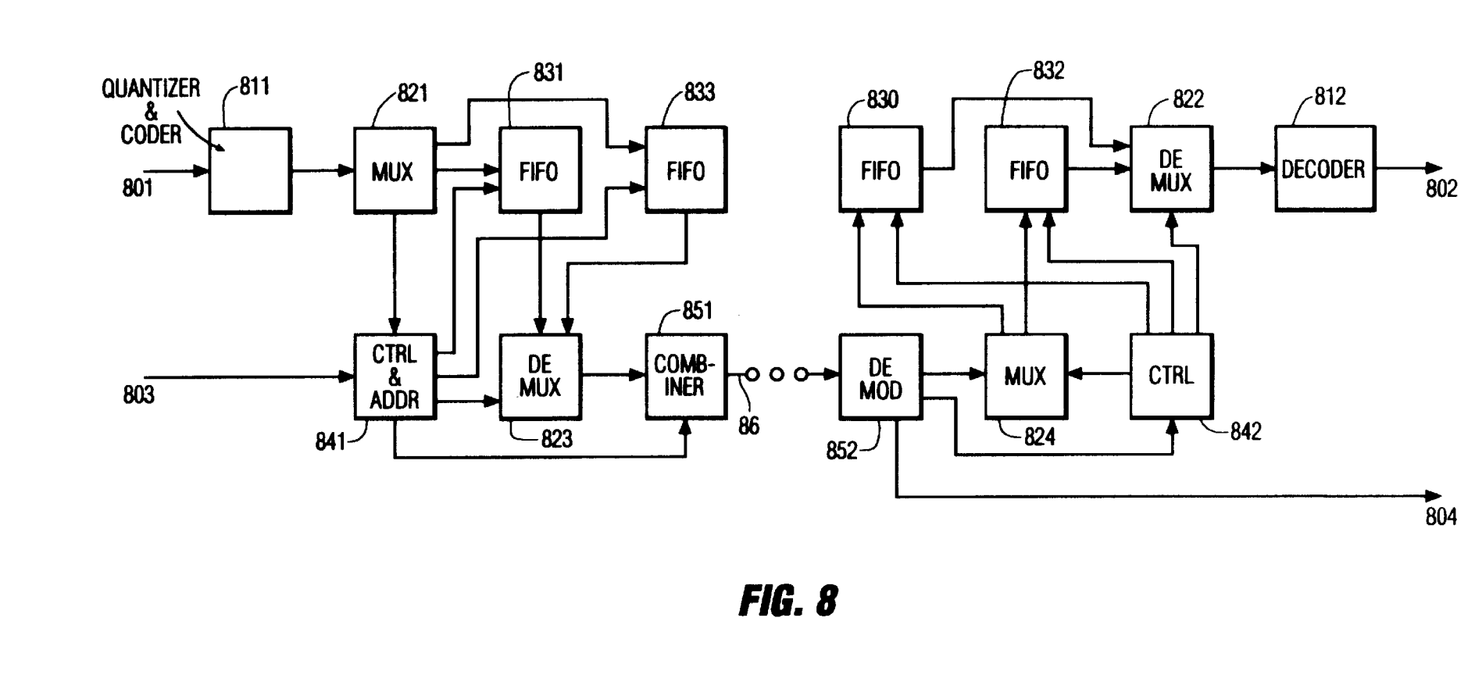
FIG. 8 is a block diagram of a preferred embodiment which uses the method according to FIGS. 4 and 5.

FIG. 8 shows the block diagram of a coder for the method according to FIGS. 3 through 5. The coder includes a quantizer 811, a multiplexer 821, a demultiplexer 823, FIFO memories 831 and 833, a control circuit 841 and a signal combining circuit 851. The block diagram also illustrates a transmission output terminal 86, a storage medium, such as a tape, is also represented as an alternative for 86. The block diagram of a decoder contains a decoder circuit 812, a demultiplexer 822, a multiplexer 824, FIFO memories 830 and 832, a control circuit 842 and demodulator circuit 852. The coder can be contained within the circuit 14 or 141, and the decoder in the circuit 16 or 161 of FIG. 1.

Block-wise DCT coded picture signals are fed to the input 801 of the coder where the quantizer circuit 811, codes the signals producing variable word lengths. Corresponding output signals a1 through a3, b1 through b3, c1 through c3 are fed to the circuit 821, which contains a multiplexer in which the signals are separated into DC components a1, b1, c1, important alternating components a2, b2, c2 and less important alternating components a3, b3, c3. Direct current components a1, b1, c1 are loaded into a first-in-first-out memory, FIFO, 831 and alternating components a2, a3, b2, b3, c2, c3 into a second FIFO memory 833. The level of filling of the first FIFO memory 831, or of the second FIFO memory 833, or a combination of the two, for example the sum, of the two levels can be advantageously used as the regulating variable for the quantizing characteristic curve of the quantizer circuit 811. The quantizing characteristic curve of the quantizer 811 and the size of the FIFO memories 831 or 833 must be selected to prevent overflow or underflow in the FIFO memories 831 or 833.

In the demultiplexer circuit 823, direct and alternating components a1 through a3, b1 through b3, c1 through c3 from the two FIFO memories 831 and 833 are assembled according to the arrangement on the track section 33 and end-of-block markings a4, b4, c4 are added. In signal combining circuit 851, several blocks A, B, C are each combined to form one superblock 40 and provided with superblock address information 401 or 402 and, for example, provided with channel modulation and an error detection/correction data.

The control circuit 841 receives signals from the multiplex circuit 821, which indicate the respective actual processing of signal components a1 through c1 or a2 through c2 or a3 through c3 or c3F. Control circuit 821 also receives signals from the input 803, which indicate the location of the current block in the signal before the coding or, respectively, after the decoding. The control circuit 841 supplies the read and write addressing for the FIFO memories 831 and 833, controls the demultiplexer circuit 823, the insertion of end-of-block flags or markings a4, b4, c4 and also controls the circuit 851 to combine the blocks into superblocks 40 and add one of the addresses 401 or 402 to the superblocks.

The output signal from signal combining circuit 851 is transmitted, or stored, at 86 and upon reproduction is fed to the demodulator circuit 852 in the decoder. The channel modulation removal and error correction and the separation of superblock addresses 401 or 402 take place in circuit 852. Superblock addresses 401 or 402 are available at the output terminal 804 of the decoder. DC components a1, b1, c1 or alternating components a2, a3, b2, b3, c2, c3, c3F are separated from the data stream in a circuit 824, which contains a multiplexer and an end-of-block marking decoder, and loaded into a third FIFO memory 830 or a fourth FIFO memory 832. The signal components are arranged into a format, such as that shown on track section 32 in FIG. 3, by the demultiplexer circuit 822 and decoded according to their variable word length in the decoder circuit 812. Signal blocks with constant word length and their associated addresses 804 within the picture are then available at the output terminal 802 of the decoder 812. The use of a superblock format enables reproduction in the search operating mode without picture segmentation. The control circuit 842 receives block addresses from demodulation circuit 852 which supplies the read and write addressing for direct components a1, b1, c1 or alternating components a2, a3, b2, b3, c2, c3, c3F in the FIFO memories 830 or 832 and also controls the multiplexer in circuit 824 and the demultiplexer in circuit 822.

Figure 9:
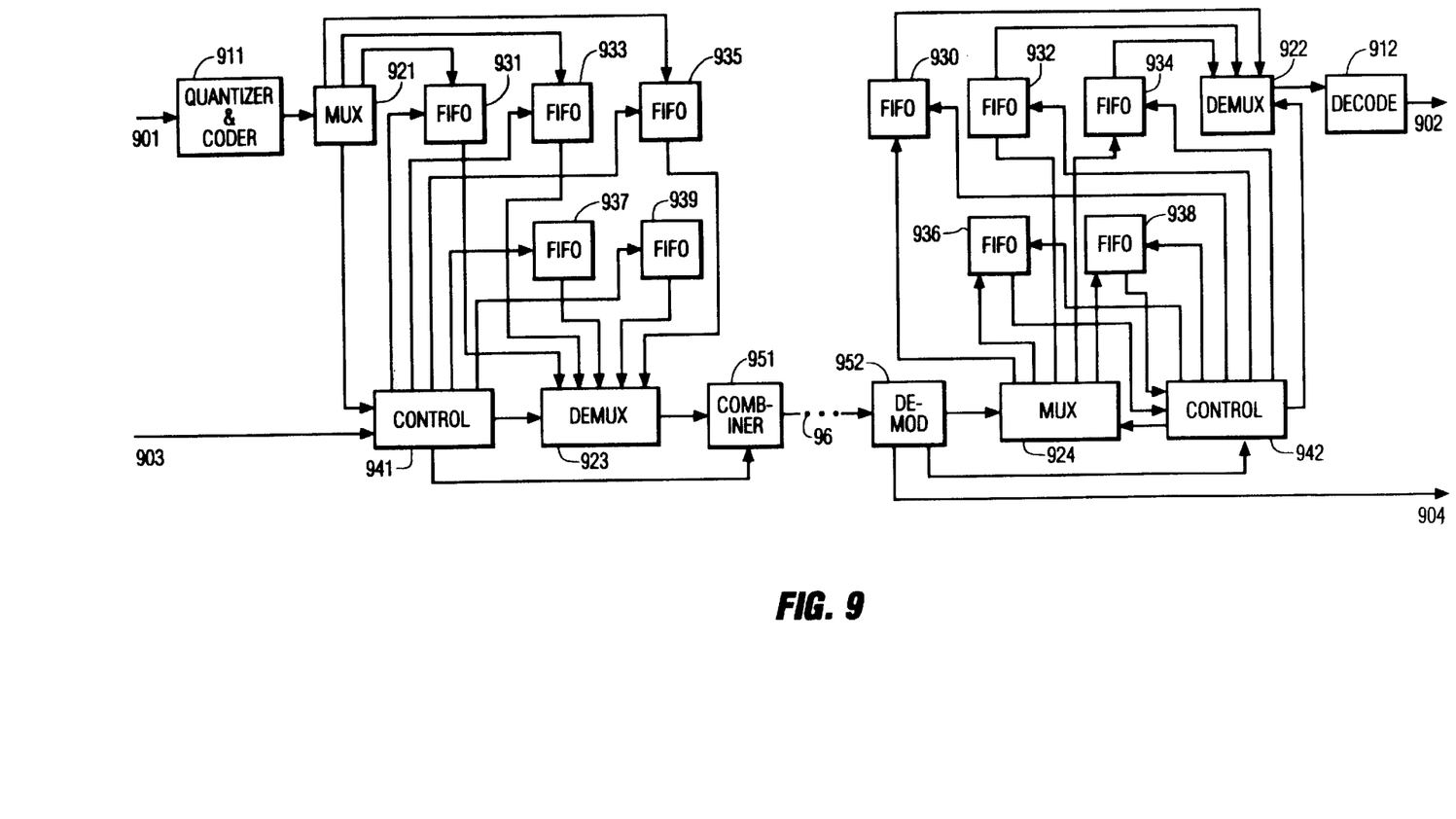
FIG. 9 shows a block diagram of a preferred embodiment which uses the method according to FIGS. 6 and 7.

FIG. 9 is a block diagram for coding and decoding using the method according to FIGS. 3, 6 and 7. The coder contains a quantizer circuit 911, a multiplexer 921, FIFO memories 931, 933, 935, 937 and 939, a control circuit 941, a demultiplexer 923, signal combining circuit 951, and a transmission or storage medium 96. The decoder contains a decoder 912, a demultiplexer 922, a multiplexer 924, FIFO memories 930, 932, 934, 936 and 938, control circuit 942 and demodulator 952. The coder can be contained, for example, within the circuit 14 or 141 of FIG. 1 and the decoder within the circuit 16 or 161 of FIG. 1.

In FIG. 9, blockwise DCT coded picture signals are input to the input terminal 901 of a coder. The coder includes a circuit 911, which contains a quantizer which codes the signals with variable length words. Corresponding output signals a1 through a3, b1 through b3, c1 through c3 are fed to the multiplexer circuit 921, which separates or orders the signals into direct components a1, b1, c1, important alternating components a2, b2, c2 and less important alternating components a3, b3, c3. Direct components a1, b1 through n1 of a segment (for example 61, or picture 60) are loaded into a first FIFO memory 931, important alternating components a2, b2 through n2 are loaded into a second FIFO memory 933 and less important alternating components a3, b3 through n3 are loaded into a third FIFO memory 935. The addresses a5, b5 through n5 of the important alternating components a2, b2 through n2 are loaded into a fourth FIFO memory 937 and the addresses a6, b6 through n6 of the less important alternating components a3, b3 through n3 are loaded into a fifth FIFO memory 939.

The level of filling of the FIFO memories 931, 933, 935, 937 and 939, or the sum of the levels, stored in several FIFO memories can be advantageously used as the regulating variable for the quantizing characteristic curve of the circuit 911. The quantizing characteristic curve of the circuit 911 and the size of the FIFO memories 931, 933, 935, 937, 939 must be proportioned so that no overflow or underflow occurs in the FIFO memories 931, 933, 935, 937, 939.

Direct and alternating components a1, b1 through n1, a2, b2 through n2, a3, b3 through n3 and their addresses a5, b5 through n5, a6, b6 through n6 from the five FIFO memories 931, 933, 935, 937, 939 are configured by the demultiplexer in the circuit 923 according to the arrangement on the track section in FIG. 7. In combiner circuit 951, for example, segments 61, 62 are marked with their addresses 701 and 702 which identify their locations within the picture 60. Alternatively, the full picture 60 can be marked with one of the picture addresses 701 or 702. Circuit 951 also provides channel modulation and the addition of error detection/correction codes.

The control circuit 941 receives signals from the multiplex circuit 921, these signals indicate the respective actual processing of signal components a1, b1 through n1, a2, b2 through n2 or a3, b3 through n3. The input terminal 903 also receives signals which indicate the location of the current block in the signal before the coding, which is also the position after decoding. The control circuit 941 supplies the respective read and write addressing for the FIFO memories 931, 933, 935, 937, 939, controls the circuit 923 with the demultiplexer and controls the circuit 951 with the addressing 701 or 702 of segments 61, 62 or, with the allocation of picture numbers 701 or 702 of pictures 60.

The output signal from the circuit 951 is either stored at 96, for example on magnetic media, or transmitted to the decoder for reproduction. The signal is input to the demodulator circuit 952 of the decoder. The channel demodulation, error correction, and the separation of segment addresses or picture numbers 701, 702 are performed in demodulator circuit 952. The segment addresses or the picture numbers 701, 702 are available at the output terminal 904 of the decoder.

Direct components a1, b1 through n1, important alternating components a2, b2 through n2 and their addresses a5, b5 through n5, less important alternating components a3, b3 through n3 and their addresses a6, b6 through n6 are separated from the data stream in a circuit 924, which contains both a multiplexer and an address decoder. The separated components are loaded into FIFO memories 930, 932, 934, 936 and 938. Demultiplexer circuit 922 arranges the signal components in a form similar to that shown in track 32 of FIG. 3. Decoder 912 decodes the variable length words to produce signal blocks with constant word length at output terminal 902. The associated addresses within the picture are output at terminal 904. In a search mode of operation with segment-type or picture-type of recorded data format, the less important alternating components a3, b3 through n3, for example, are replaced with zeros before the decoding thus reducing the spatial resolution.

The control circuit 942 receives block addresses from circuit 952 and supplies the read and write addresses for direct components a1, b1 through n1, the important alternating components a2, b2 through n2, the less important alternating components a3, b3 through n3 and their addresses in the FIFO memories 930, 932, 934, 936, 938 respectively. The control circuit 942 also controls the multiplexer in circuit 924 and the demultiplexer in circuit 922.

What is claimed is:

1. Digital video recording apparatus comprising:
   means for receiving a block coded video image representative signal comprising components representing spatial frequencies including DC and AC frequency information;
   means for grouping components of substantially the same type derived from at least first and second blocks of said block coded signal to produce signal groups for recording; and,
   means for recording said signal groups on a recording medium.

2. The digital video recording apparatus of claim 1, wherein said signal groups having a range from most to least significance.

3. The digital video recording apparatus of claim 2, wherein one group of said signal groups having most significance in said range represents said DC component.

4. The digital video recording apparatus of claim 3, wherein said signal groups having progressively less significance in said range represent AC components having progressively higher spatial frequencies.

5. The digital video recording apparatus of claim 1, wherein said video image representative signal is coded by discrete cosine transform.

6. The digital video recording apparatus of claim 5, wherein said discrete cosine transform is applied to blocks of said image represented by said coded signal.

7. The digital video recording apparatus of claim 1, further comprising a reproducing means for transducing said signal groups from said medium and means for processing said signal groups to generate an output signal representative of said coded video image signal.

8. The digital video recording apparatus of claim 7, wherein said apparatus reproduces at a speed substantially the same as a recording speed and said output signal having a range of spatial frequencies.

9. The digital video recording apparatus of claim 8, wherein said apparatus reproduces at a faster speed than said speed of recording, and said output signal having a reduced range of spatial frequencies relative to said range reproduced at said speed substantially the same as said recording speed.

10. An apparatus for reproducing a signal recorded on a medium comprising:

a transducer transducing said recorded signal corresponding to a discrete cosine transform block coded digital video signal, said recorded signal having a first data group signal derived from at least first and second blocks of said block coded signal, where DC components of said discrete cosine transform coded digital video are grouped together, and a second data group derived from at least first and second blocks of said block coded signal, having AC components of substantially the same type grouped together;

a processor coupled to said transducer for receiving said transduced signal and separating said data groups; and means coupled to said processor for ungrouping said DC components, and said AC components from respective data groups, to produce at an output, said block processed discrete cosine transform coded digital video signal.

11. The reproducing apparatus of claim 10, wherein said data groups are assembled in data segments.

12. The reproducing apparatus of claim 11, wherein each segment of said data segments includes an address.

13. The reproducing apparatus of claim 12, wherein said segment addresses include error detection data words.

14. The reproducing apparatus of claim 10, wherein said reproducing apparatus is a helical scanning magnetic reproducing apparatus.

15. The reproducing apparatus of claim 10, wherein said apparatus reproduces at a speed faster than a normal reproducing speed, said block coded discrete cosine transformed digital video signal at said output has reduced spatial resolution relative to that reproduced at said normal reproducing speed.

16. The reproducing apparatus of claim 10, wherein reproducing at a speed faster than a normal reproducing speed, said block coded discrete cosine transformed digital video signal at said output has substantially the same temporal resolution as that reproduced at said normal reproducing speed.

17. The reproducing apparatus of claim 12, wherein said reproducing apparatus reproduces at a speed other than a recording speed, and said transducer transduces partial sections of said recorded signal containing at least said segment address and said first data group.

18. Digital video replay apparatus comprising:

means for reproducing a recorded signal comprising groups of signal components representing spatial frequency information including DC and AC frequencies describing a block coded signal, where each group of said groups is derived from at least first and second blocks of said block coded signal, and has substantially the same type of information, and said groups have a range from most to least significance;

means for ungrouping components of substantially the same type to form a signal comprising components having a range from most to least significance; and, means for assembling said components having a range from most to least significance to form a coded signal representative of a video image signal for coupling to an output.

19. The digital video replay apparatus of claim 18, wherein said coded signal is coded by discrete cosine transform having DC and AC components representing progressively increasing spatial frequency image information in a range from most to least significance.

20. The digital video replay apparatus of claim 19, wherein said DC component has most significance in said range and said AC components representing progressively increasing spatial frequency have progressively decreasing significance in said range.

21. The digital video replay apparatus of claim 19, wherein said transform is applied to image blocks represented by said coded signal.

22. The digital video replay apparatus of claim 21, wherein said groups of signal components of the same type represent an area of said image comprising a plurality of said image blocks.

23. Digital reproducing apparatus comprising:

means for reproducing from a medium a recorded signal representing a block coded DCT video image signal;

said recorded signal comprising a first signal group of most significant data components derived from at least first and second blocks of said block coded signal, and having a predetermined location on said medium;

said recorded signal further comprising a second signal group located on said medium adjacent said first signal group and comprising a plurality of data components of lesser significance;

means coupled to said reproducing means for ungrouping said plurality of said most significant data components and for ungrouping said plurality of data components of lesser significance; and, processing means coupled to said ungrouping means for processing said most significant and said lesser significant data components to produce said block coded DCT video image signal.

24. The digital reproducing apparatus of claim 23, wherein said first and said second signal groups are contiguous on said medium.

25. The digital reproducing apparatus of claim 23, wherein reproduction at a first speed greater than a speed of recording, said reproducing means reproduces said first and said second signal groups.

26. The digital reproducing apparatus of claim 23, wherein reproduction at a second speed greater than said first reproduction speed, said reproducing means reproduces said first group.

27. Digital recording apparatus comprising:

means for receiving a block coded DCT video image representative signal;

said image representative signal comprising most significant data components and a plurality of data components of lesser significance;

means for grouping a plurality of said most significant data components to form a first signal group derived from at least first and second blocks of said block coded signal, and for grouping data components of said plurality of lesser significance derived from at least first and second blocks of said block coded signal, to form a second signal group; and, means for recording said first signal group on a recording medium, and recording said second signal group on said recording medium adjacent to said first signal group.

28. The digital recording apparatus of claim 27, wherein said second signal group represents data components of progressively reducing significance.

29. The digital recording apparatus of claim 27, wherein said second signal group represents spatial resolution of progressively increasing frequency.

30. The digital recording apparatus of claim 27, additionally comprising a replay transducer, said apparatus reproduces at a first speed greater than a speed of recording, said replay transducer transduces said first signal group and said second signal group from said recording medium.

31. The digital recording apparatus of claim 30, wherein said apparatus reproduces at a second speed greater than said first speed and said replay transducer transduces only said first signal group from said recording medium.

32. The digital recording apparatus of claim 31, wherein said video image representative signal transduced at said second speed having a lower spatial resolution lower than a spatial resolution of said video image representative signal reproduced at said first speed.

33. An apparatus for reproducing a signal recorded on a medium comprising:

a transducer transducing said recorded signal corresponding to a discrete cosine transform coded digital video signal, said recorded signal having a first data group where DC components of said discrete cosine transform coded digital video signal are grouped together, and a second data group having AC components of substantially the same type grouped together;

a processor coupled to said transducer for receiving said transduced signal and separating said data groups; and means coupled to said processor for ungrouping said DC components, and said AC components from respective data groups, to produce at an output, said block processed discrete cosine transform coded digital video signal, wherein reproducing at a speed faster than a normal reproducing speed, said block coded discrete cosine transformed digital video signal at said output has substantially the same temporal resolution as that reproduced at said normal reproducing speed.

* * * * *

UNITED STATES PATENT AND TRADEMARK OFFICE
CERTIFICATE OF CORRECTION

PATENT NO.   : 6,101,314
DATED        : August 8, 2000
INVENTOR(S)  : Heinz Werner Keesen It is certified that error appears in the above-identified patent and that said Letters Patent is hereby corrected as shown below:

<u>Title page,</u>
Please amend cover page to include foreign application priority data as follows:

-- August 3, 1989 [DE] Fed. Rep. Of Germany ... 3925663 --

Signed and Sealed this

Thirteenth Day of November, 2001

Attest:

*Nicholas P. Godici*

NICHOLAS P. GODICI
*Attesting Officer*   *Acting Director of the United States Patent and Trademark Office*